United States Patent [19]

Tadakuma et al.

[11] Patent Number: 5,003,243

[45] Date of Patent: Mar. 26, 1991

[54] CONTROL APPARATUS FOR INDUCTION MACHINE

[75] Inventors: Susumu Tadakuma, Atsugi; Shigeru Tanaka, Tama, both of Japan

[73] Assignee: Kabushiki Kaisha Toshiba, Kawasaki, Japan

[21] Appl. No.: 250,171

[22] Filed: Sep. 28, 1988

[30] Foreign Application Priority Data

Sep. 29, 1987 [JP] Japan .................. 62-244462
Sep. 29, 1987 [JP] Japan .................. 62-244463

[51] Int. Cl.⁵ ............................................. H02P 5/40
[52] U.S. Cl. ................................. 318/800; 318/808
[58] Field of Search ............. 318/800, 805, 808, 807, 318/809–811, 802, 803

[56] References Cited

U.S. PATENT DOCUMENTS

| | | |
|---|---|---|
| 3,824,437 | 7/1974 | Blaschke . |
| 4,451,771 | 5/1984 | Nagase et al. .................. 318/800 |
| 4,503,375 | 3/1985 | Okuyama ........................ 318/802 |
| 4,780,658 | 10/1988 | Koyama ......................... 318/805 |
| 4,792,742 | 12/1988 | Fujimoto et al. ................ 318/800 |
| 4,808,903 | 2/1989 | Matsui et al. ................... 318/800 |

OTHER PUBLICATIONS

A. Nabae, et al, *IEEE Transactions on Industry Applications*, "An Approach to Flux Control of Induscion Motors Operated with Variable-Frequency Power Supply"; vol. IA-16, No. 3, May/Jun. 1980, pp. 342-350.

*Primary Examiner*—David Smith, Jr.
*Attorney, Agent, or Firm*—Foley & Lardner, Schwartz, Jeffery, Schwaab, Mack, Blumenthal & Evans

[57] ABSTRACT

A slip frequency type vector control apparatus for an induction machine which is provided with first and second feedback circuits for correcting respective magnetization current command and torque current command supplied feed-forwardly so as to eliminate the influence of a change in temperature of the induction machine secondary resistance and realize a correct vector control.

2 Claims, 5 Drawing Sheets

CONTROL APPARATUS FOR INDUCTION MACHINE

BACKGROUND OF THE INVENTION

1. Field of the Art

The present invention relates to a control apparatus for conducting variable speed control of an induction machine through vector control and more particularly, to a control apparatus for an induction machine comprising means for calculating a magnetization current command in accordance with a secondary flux command, means for calculating a torque current command in accordance with a torque command, means for calculating a slip frequency command in accordance with the secondary flux command and the torque command, means for generating a primary current command in accordance with the amplitude corresponding to that of vector sum of the magnetization current command and the torque current command and in accordance with the phase corresponding to that of the primary current command, and means for controlling the primary current of the induction machine in accordance with the primary current command.

2. Prior Art

Power converters such as inverters and cycloconverters can now be easily realized due to remarkable developments in the field of power semiconductor devices. Thus, induction motors heretofore generally used as constant speed motors have now been extensively applied to variable speed motors.

As the variable speed control methods for induction motors, the vector control method is frequently adopted due to its excellent response characteristics. In particular a flux detection type vector control method and a slip frequency type vector control method are known. The former method uses the vector quantity of detected secondary flux as a control signal for a primary current, and the latter method controls the primary current by a vector flux calculated in accordance with motor constants.

For a conventional slip frequency type vector control apparatus, it is necessary to calculate a magnetization current component command $i_{1R}^*$, a torque current component command $i_{1I}^*$ and a slip frequency command $\omega_S^*$. However, the secondary resistance $R_2$ of an induction motor is directly concerned with the calculation. As the temperature of the rotor rises, the secondary resistance $R_2$ increases so that a difference becomes present between the calculated value and the actual value. Thus, the main flux varies and the calculation result of the slip frequency command $\omega_S^*$ is influenced greatly so that the proper vector control characteristics cannot be maintained.

The influence of the secondary resistance is not associated with flux detection type vector control apparatus. However, there is a disadvantage that a secondary leakage inductance error is present since the calculated result is the secondary flux neglecting the secondary leakage inductance, i.e., only the gap inductance. In spite of such an error, the flux detection type vector control apparatus has the following advantage: even if the constants of the primary and secondary circuits of an induction motor vary, the voltage and current of each phase to be input to the flux calculator change so that the flux calculation result changes correspondingly, and the vector control characteristics are less degraded even if the circuit parameters vary.

From the point of view of practical circuit arrangement there are many problems regarding the precision and resolution of a flux detector, and regarding low calculation precision of a flux calculator due to voltage distortion at low speed operation which makes it difficult to obtain a sufficient starting torque.

SUMMARY OF THE INVENTION

It is an object of the present invention to provide an induction machine control apparatus capable of minimizing the influence by a change of a secondary resistance $R_2$ and generating a torque as set by the command during the operation including the start time.

To achieve the above object, slip frequency type vector control apparatus according to the first invention is provided comprising: first correction means for correcting a magnetization current command so as to reduce to zero a deviation of an actual flux from a secondary flux command relative to the direct axis of a rotary coordinate system which is constructed of the direct axis in the flux direction and the quadrature axis orthogonal to the direct axis; and second correction means for correcting a slip frequency command so as to reduce to zero the flux relative to the quadrature axis.

A slip frequency type vector control apparatus according to the second invention is provided comprising: first correction means for correcting a magnetization current command so as to reduce to zero a deviation of an actual flux from a secondary flux command relative to the direct axis of a rotary coordinate system which is constructed of the direct axis in the flux direction and the quadrature axis orthogonal to the direct axis; and second correction means for correcting a slip frequency command so as to reduce to zero a deviation of an actual torque current from a torque current command.

DETAILED DESCRIPTION OF THE PREFERRED EMBODIMENTS

Figure 1:
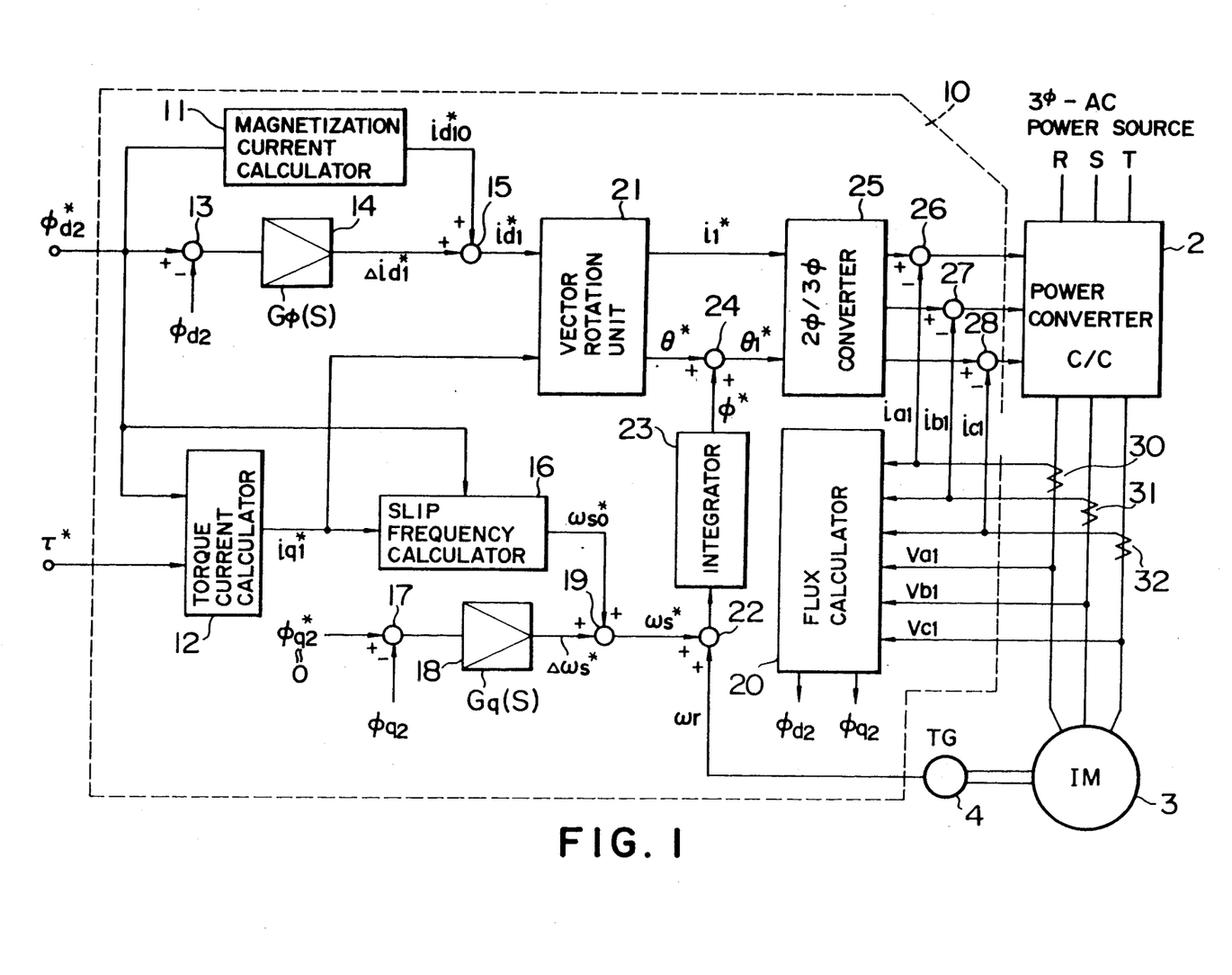
FIG. 1 is a block diagram showing an embodiment of a slip frequency type vector control apparatus according to the present invention.

FIG. 1 shows a first embodiment of the slip frequency type vector control apparatus according to the present invention. The vector control apparatus controls a power converter 2 and an induction motor (IM) 3. The power converter 2 is diagrammatically shown as a cycloconverter (C/C) in the figure. The cycloconverter may be replaced by a rectifier and an inverter. The rotary speed of the induction motor 3 is detected by a speed detector 4. Current detectors 30, 31 and 32 are provided for detection of primary currents $i_{a1}$, $i_{b1}$ and $i_{c1}$ of the induction motor 3. The detected primary currents $i_{a1}$, $i_{b1}$ and $i_{c1}$ and the input voltages $v_{a1}$, $v_{b1}$ and $v_{c1}$ of the induction motor 3 which are derived by other suitable means are supplied to the control apparatus 10 to which a secondary flux command (direct axis flux command) $\Phi_{d2}^*$ and a torque command $\tau^*$ are also supplied.

The direct axis flux command $\Phi_{d2}^*$ is converted into a basic magnetization current command $i_{d10}^*$ by a magnetization current calculator 11, whereas the torque command $\tau^*$ together with the direct axis flux command $\Phi_{d2}^*$ is converted into a torque current command $i_{q1}^*$ by a torque current calculator 12. The basic flux current command $i_{d10}^*$ and the torque current command $i_{q1}^*$ are the commands in the rotary coordinate system wherein the rotary flux is made coincident with a d axis thereof.

A main difference of the present invention from the prior art concept is the method of generating a magnetization command $i_{d1}^*$ and a slip frequency command $\omega_S^*$ both through the feed-forward control and feedback control which will be described below.

Conventionally, the magnetization current command $i_{d1}^*$ has been considered to be unambiguously determined if only the direct axis flux command $\Phi_{d2}^*$ is determined. However, in practice, as the mutual inductance M varies due to magnetic saturation, the calculation of the magnetization current command $i_{d1}^*$ is directly influenced in accordance with the formula:

$$M \cdot i_{d1}^* = \Phi_{d2}^* \quad (1)$$

Consequently, calculation by the formula (1) does not guarantee that the actual flux $\Phi_{d2}$ of a motor really takes a commanded value.

In consideration of the above point, a magnetization current correction signal $\Delta i_{d1}^*$ obtained by a controller 14 based on a flux deviation $\Phi_{d2}^* - \Phi_{d2}$ obtained by a subtracter 13 is added to the magnetization current command $i_{d10}^*$ obtained through the formula (1) by an adder 15, to thus obtain a corrected magnetization current command $i_{d1}^*$. Namely:

$$i_{d1}^* = i_{d10}^* + \Delta i_{d1}^* \quad (2)$$

A similar problem is associated also with the slip frequency command $\omega_s^*$. Conventionally, the slip frequency command $\omega_s^*$ has been obtained first by calculating a torque current from the torque command $\tau^*$ by the formula (3):

$$i_{q1}^* = (L_2/M) \cdot (\tau^*/\Phi_{d2}^*) \quad (3)$$

and using the following formula (4):

$$\omega_S^* = (M/L_2) \cdot (R_2/\Phi_{d2}^*) \cdot (i_{q1}^*) \quad (4)$$

Assuming that the actual flux $\Phi_{d2}$ is coincident with the flux command $\Phi_{d2}^*$ through the above-described direct axis flux control, the torque current command obtained by the formula (3) is correct. However, if the secondary resistance $R_2$ varies, the slip frequency command $\omega_s^*$ has an error corresponding in amount to the variation of the secondary resistance $R_2$ as understood from the formula (4), resulting in an incorrect slip frequency command. The reason for this is that the relation expressed by the formula (4) is no longer guaranteed for an actual motor although the formula (4) has been derived under the definitions that the direct axis is in the direction of the secondary flux and the axis orthogonal to the direct axis, i.e., the axis along which the flux becomes null, is the quadrature axis.

To solve the above problem, the slip frequency obtained through the formula (4) is calculated by a slip frequency calculator 16 which outputs $\omega_{so}^*$. A difference of the actual quadrature axis flux $\Phi_{q2}$ from the quadrature axis flux command $\Phi_{q2}^*$ taking a value of 0, i.e., $\Phi_{q2}^* - \Phi_{q2} = -\Phi_{q2}$, is obtained by a subtracter 17. Then, a slip frequency correction signal $\Delta\omega_s^*$ is obtained by a controller 18 so as to reduce the difference $-\Phi_{q2}$ to zero. The slip frequency correction signal $\Delta\omega_S^*$ and the output $\omega_{so}^*$ from the slip frequency calculator 16 are added together by an adder to obtain a corrected slip frequency command $\omega_s^*$. Namely:

$$\omega_s^* = \omega_{so}^* + \Delta\omega_s^* \quad (5)$$

The control apparatus shown in FIG. 1 has been made in accordance with the above concept.

In the control apparatus shown in FIG. 1, the slip frequency command $\omega_s^*$ is finely adjusted by the feedback system so as to make the secondary flux direction coincide with the direct axis and the direction orthogonal to the direct axis coincide with the quadrature axis, and the closed loop is constructed so as to make the amplitude $\Phi_{d2}$ of the secondary flux, i.e., the direct axis flux, coincide with the command value $\Phi_{d2}^*$. The fundamental vector control can be carried out with such a feedback system. However, to improve the response during transient operation, the magnetization current calculator 11 and the slip frequency calculator 16 are employed.

The flux $\Phi_{d2}$ for obtaining the magnetization current correction signal $\Delta_{d1}$ and the flux $\Phi_{q2}$ for obtaining the slip frequency correction signal $\Delta\omega_s^*$ are calculated by a flux calculator 20 which will be described later.

After obtaining the primary current commands $i_{d1}^*$ and $i_{q1}^*$ and the slip frequency command $\omega_s^*$ through the formulas (2), (3) and (5), the succeeding vector control calculation is performed in a similar manner as conventional. In particular, the direct axis current command $i_{d1}^*$ and the quadrature axis current command $i_{q1}^*$ are converted into the absolute value $i_1^*$ and the phase $\theta^*$ of the primary current on the rotary coordinate system by a vector rotation unit 21. The slip frequency command $\omega_s^*$ and the angular frequency $\omega_r$ of the rotor are added together by an adder 22 to obtain the phase $\Phi^*$ by an integrator 23 using the addition result of the adder 22. The phase $\Phi^*$ is representative of the position (position on the d axis) of the flux as seen on the stationary two axes. The sum $\theta_1^* = \Phi^* + \theta^*$ of the phases $\Phi^*$ and $\theta^*$ is obtained by an adder 24. The sum $i_1^*$ is the phase of the primary current $i_1^*$ as seen on the stationary two axes. The primary current $i_1^* e^{j\theta_1^*}$ in the polar coordinate notation is converted into three phases by a $2\Phi/3\Phi$ converter 25 to obtain phase current commands $i_{a1}^*$, $i_{b1}^*$ and $i_{c1}^*$ for respective phases a, b and c. The differences of the phase current commands from primary currents $i_{a1}$, $i_{b1}$ and $i_{c1}$ detected by the current detectors 30 to 32 are obtained by respective subtracters 26, 27 and 28. The power converter 2 is then controlled so as to reduce the differences to zero.

Next, the method of calculating or estimating the fluxes $\Phi_{d2}$ and $\Phi_{q2}$ will be described.

The fluxes relative to the two axis ($\alpha$ and $\beta$ axes) of the stator may be detected by mounting flux sensors on the stator of a motor. However, without using the flux sensors, the fluxes may be calculated or estimated. The flux calculator 20 shown in FIG. 1 is provided to perform such function. The flux calculator 20 will now be described in detail with reference to FIGS. 2 and 3.

Figure 2:
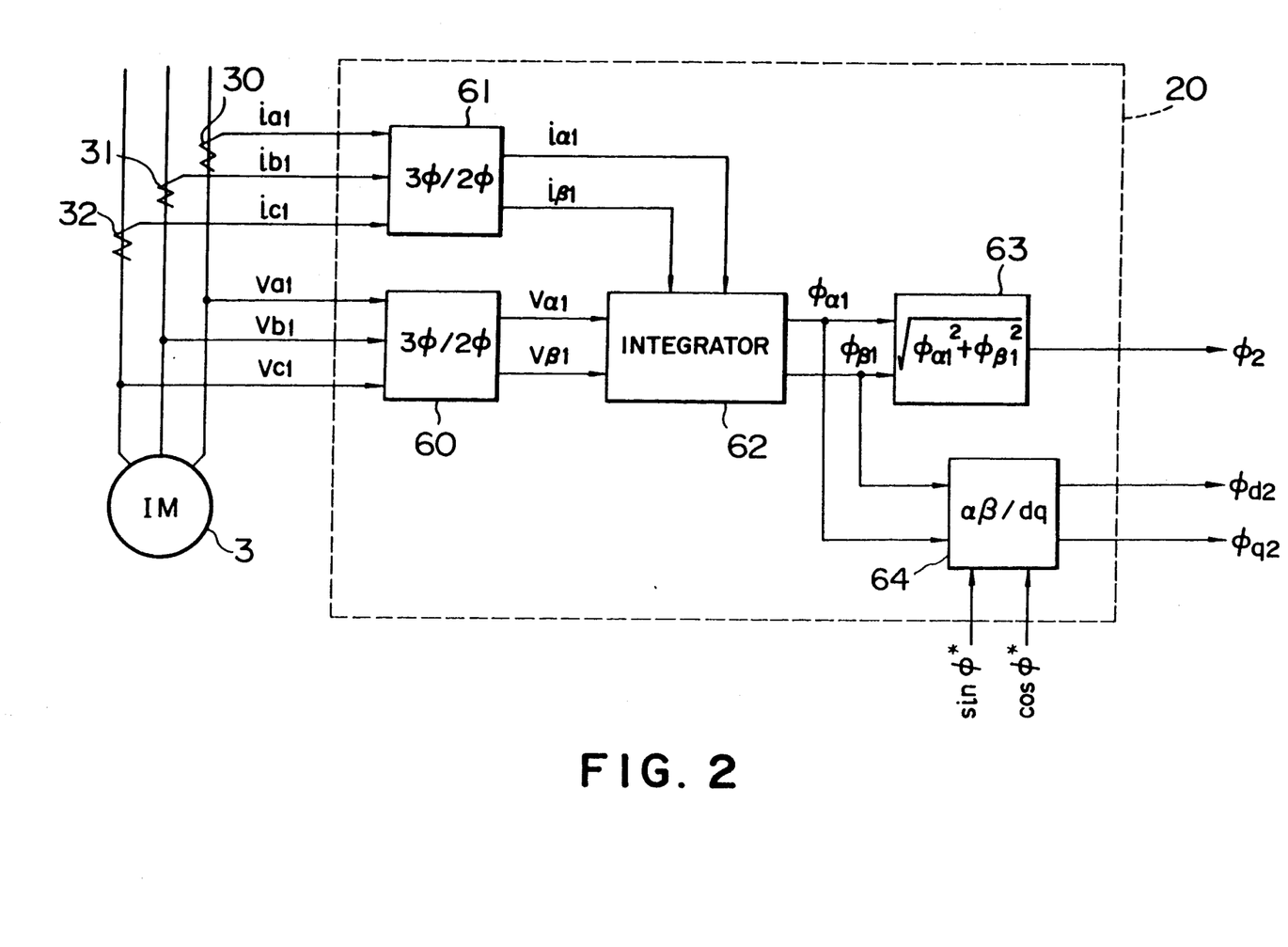
FIG. 2 is a block diagram showing an example of the circuit arrangement of the flux calculator shown in FIG. 1.

FIG. 2 shows the internal circuit arrangement of the flux calculator 20. Signals representative of the three phase voltages $v_{a1'}$, $v_{b1'}$ and $v_{c1}$ applied to the induction motor 3 are supplied to a 3Φ/2Φ converter 60, and signals representative of the three phase currents $i_{a1'}$, $i_{b1'}$ and $i_{c1}$ are supplied to a 3Φ/2Φ converter 61, thereby converting the signals into signals on the stator two axis (α and β axes) system in a known manner. The α axis component $\Phi_{\alpha 1}$ and β axis component $\Phi_{\beta 1}$ of the secondary flux can be calculated by the following formulas (6) and (7) wherein the voltages and currents on the α and β axes after the conversion are represented by $v_{a1}$, $v_{\beta 1}$ and $i_{\alpha 1}$ and $i_{\beta 1}$, respectively:

$$\Phi_{\alpha 1} = \int \{v_{\alpha 1} - i_{\alpha 1} \cdot R_1 - l_1(di_{\alpha 1}/dt)\} dt \quad (6)$$
$$\Phi_{\beta 1} = \int \{v_{\beta 1} - i_{\beta 1} \cdot R_1 - l_1(di_{\beta 1}/dt)\} dt \quad (7)$$

The calculations according to the formulas (6) and (7) are carried out by an integrator 62. In the above formulas (6) and (7), $R_1$ denotes the primary resistance, $l_1$ denotes the primary leakage inductance.

The outputs of the integrator 62 are applied on the one hand to a root square extractor 63 to obtain the combined secondary flux Φ, and on the other hand to a 2Φ(α and β axes)/2Φ(d and q axes) converter 64 to which the combined flux Φ is also applied. The values input to the converter 64 are converted into values on the rotary two axes (d and q axes) rotating in synchro with the flux on the stator two axes. The conversion is effected in accordance with the following matrix calculation:

$$\begin{pmatrix} \Phi_{d2} \\ \Phi_{q2} \end{pmatrix} = \begin{pmatrix} \cos\Phi^* & \sin\Phi^* \\ -\sin\Phi^* & \cos\Phi^* \end{pmatrix} \cdot \begin{pmatrix} \Phi_{\alpha 1} \\ \Phi_{\beta 1} \end{pmatrix} \quad (8)$$

where Φ* is the output of the integrator 23.

The direct axis flux $\Phi_{d2}$ thus obtained is used as the feedback signal for the direct axis flux control system shown in FIG. 1, and compared with the direct axis flux command $\Phi_{d2}*$ by the subtracter 13 to perform the control operation described previously. The quadrature axis flux $\Phi_{q2}$ is compared with the quadrature axis flux command $\Phi_{q2}*$ (normally 0) by the subtracter 17 to correct the slip frequency command in accordance with the obtained difference therebetween.

Figure 3:
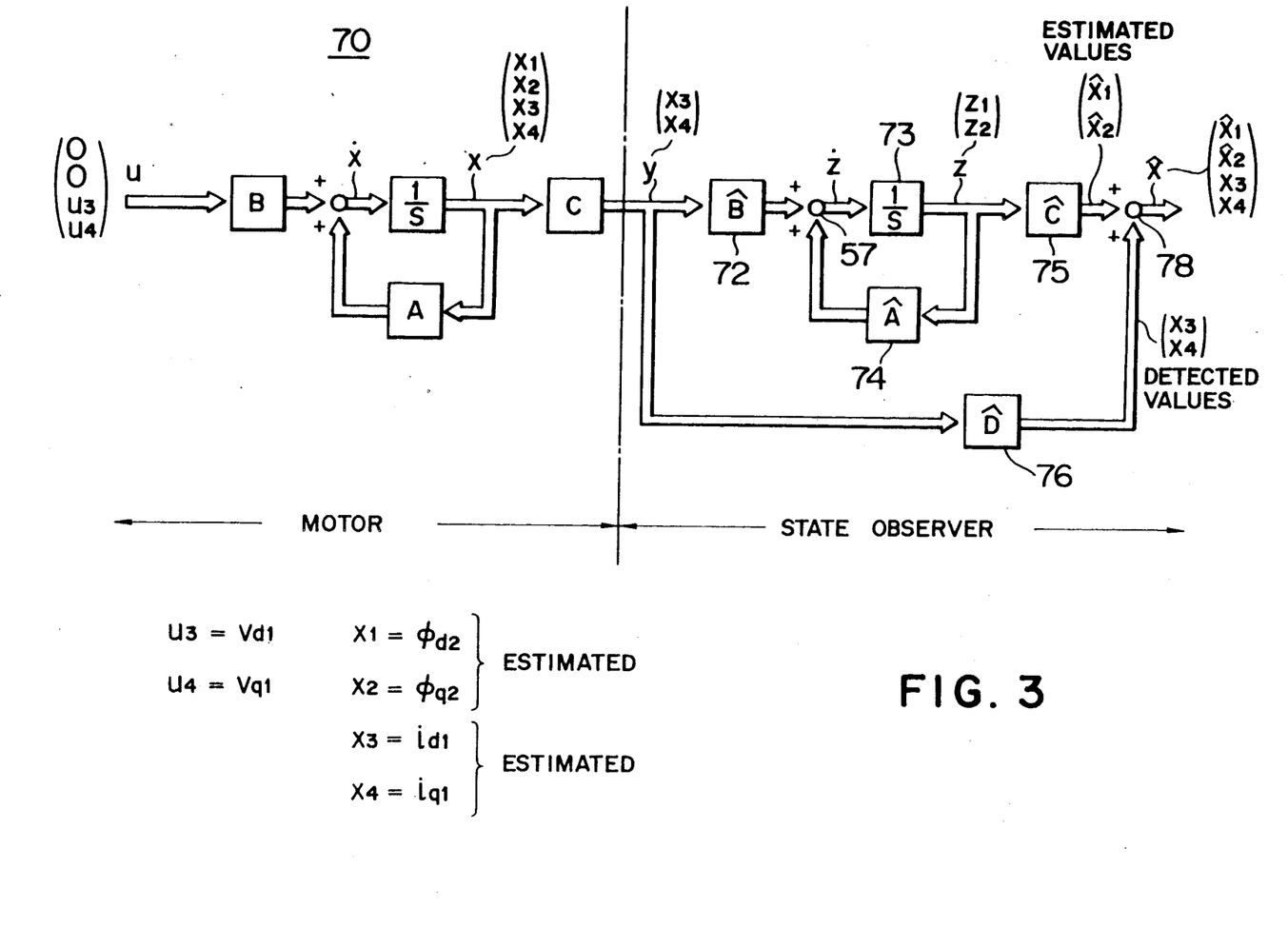
FIG. 3 schematically illustrates a flux estimation device to be used as a substitute for the flux calculator shown in FIG. 2.

FIG. 3 is the schematic diagram illustrating the method of estimating the fluxes $\Phi_{d2}$ and $\Phi_{q2}$ using a state observer in the motor system 70 expressed by a state equation. The state equation of the motor system is made on the rotary coordinate (d, g) axes. The input voltage values are $u_3 = v_{d1}$ and $u_4 = v_{q1}$, and the state variables are a direct axis flux $x_1 = \Phi_{d2}$, a quadrature axis flux $x_2 = \Phi_{q2}$, a primary current direct axis component $x_3 = i_{d1}$, and a quadrature axis component $x_4 = i_{q1}$. The state equation and the output equation are expressed as in the following.

$$\begin{bmatrix} \dot{x}_1 \\ \dot{x}_2 \\ \dot{x}_3 \\ \dot{x}_4 \end{bmatrix} = \begin{bmatrix} A_{11} & A_{12} \\ A_{21} & A_{22} \end{bmatrix} \cdot \begin{bmatrix} x_1 \\ x_2 \\ x_3 \\ x_4 \end{bmatrix} + \frac{1}{\sigma L_1} \begin{bmatrix} 0 \\ 0 \\ U_3 \\ U_4 \end{bmatrix} \quad (9)$$

where σ is a leakage coefficient, $L_1$ is a self-inductance.

$$y = \begin{pmatrix} 0010 \\ 0001 \end{pmatrix} \cdot \begin{bmatrix} x_1 \\ x_2 \\ x_3 \\ x_4 \end{bmatrix} \quad (10)$$

The elements $A_{11'}$, $A_{12'}$, $A_{21'}$ and $A_{22}$ of the matrix are given by the motor constants. As seen from the output equation (10), the currents $i_{d1}$ ($=x_3$), $i_{q1}$ ($=x_4$) can be detected, but the secondary fluxes $\Phi_{d2}$ ($=x_1$) and $\Phi_{q2}$ ($=x_2$) cannot be detected so that they are estimated by the state observer having the structure as shown in FIG. 3. The state observer frequently used in the field of the current control theory is constructed in accordance with the following concept.

Since the values $x_3$ and $x_4$ can be detected by the equation (9), these values are regarded as the inputs to a state equation with respect to the values $x_1$ and $x_2$ which is given by:

$$\begin{bmatrix} \dot{x}_1 \\ \dot{x}_2 \end{bmatrix} = [A_{11}] \cdot \begin{bmatrix} x_1 \\ x_2 \end{bmatrix} + [A_{12}] \cdot \begin{bmatrix} x_3 \\ x_4 \end{bmatrix} \quad (11)$$

In the equation (11), if the inputs of the second term on the right side of the equation are given and the values $x_1$ and $x_2$ can be determined, the state observer can be realized. The state equation using new variables $Z_1$ and $Z_2$ for the values $x_1$ and $x_2$ is shown in the right half of FIG. 3 with an integrator 73, a feedback matrix A and a coefficient matrix B. Without using the equation (11) as it is, the introduction of the integrator for the new variables Z and the constants A and B is to obtain characteristic values of A while making the convergence rapidly with the same internal structure and to adjust the level of the state quantity with respect to B. As the values Z converge, the quantities associated with the variables $x_1$ and $x_2$ can be estimated on the basis of the converged values $Z_1$ and $Z_2$. The estimated quantities are then passed through a matrix C to thus obtain the direct axis flux estimation value $x_1$ and the quadrature axis flux estimation value $x_2$. Since the d-axis and q-axis components $i_{d1}$ and $i_{q1}$ of the primary current have been detected already, they are subjected to level adjustment by a matrix D and outputted.

The direct axis component $\Phi_{d2}$ ($=x_1$) and the quadrature axis component $\Phi_{q2}$ ($=x_2$) of the secondary flux can be obtained by the state observer shown in FIG. 3. Therefore, these components are used, as described already, as the flux control feedback signals for the apparatus shown in FIG. 1.

As described so far, the feedback loop of the direct axis flux and the quadrature axis flux is constructed on the rotary coordinate (d and q axes) system. The slip frequency command to be determined based on the direct axis flux command and the torque command is given feed-forwardly to improve the response characteristic. Therefore, a highly precise vector control can be realized which automatically corrects a change of parameters, particularly the secondary resistance.

Figure 4:
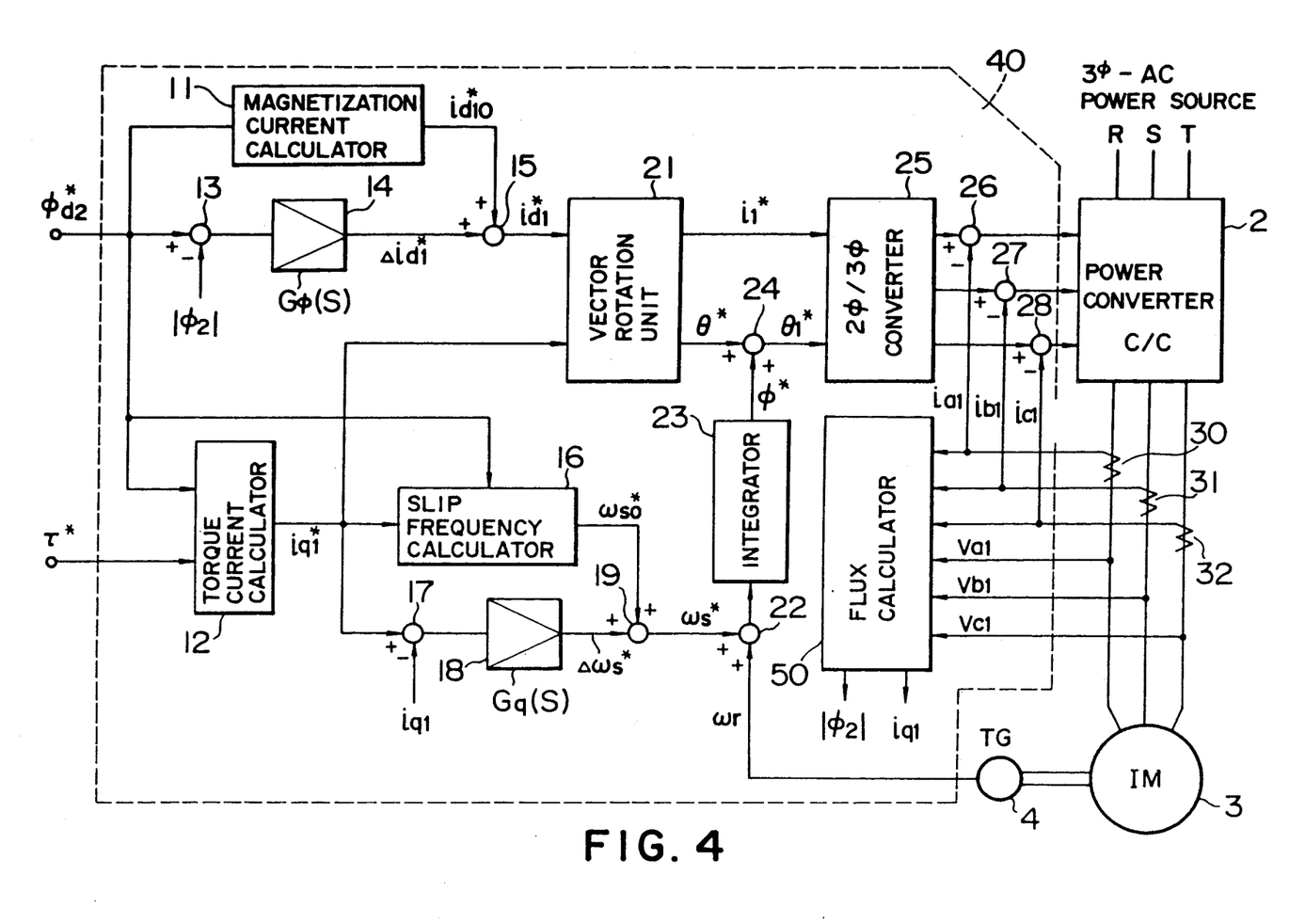
FIG. 4 is a block diagram showing another embodiment of a slip frequency type vector control apparatus according to the present invention.

FIG. 4 shows a second embodiment of the slip frequency type vector control apparatus according to the present invention.

In the control apparatus shown in FIG. 4, a magnetization current correction signal $\Delta i_{d1}^*$ obtained by a controller 14 based on a flux deviation $\Phi_{d2}^* - |\Phi_2|$ obtained by a subtracter 13 is added to the magnetization current command $i_{d10}^*$ obtained through the formula (1) by an adder 15, to thus obtain a corrected magnetization current command $i_{d1}^*$.

The slip frequency obtained through the formula (4) is calculated by a slip frequency calculator 16 which output is $\omega_{so}^*$. The slip frequency correction signal $\Delta\omega_s^*$ is obtained so as to make the actual torque current $i_{q1}$ coincide with the torque current command $i_{q1}^*$, i.e., so as to reduce the deviation therebetween to zero, through a controller 18. The slip frequency correction signal $\Delta\omega_s^*$ is added to the output $\omega_{so}^*$ by an adder 19 to obtain a real slip frequency command $\omega_s^*$.

The other elements have the same as those shown in FIG. 1.

In the control apparatus shown in FIG. 4, the slip frequency command $\omega_s^*$ is finely adjusted by the feedback system so as to make the secondary flux direction coincide with the direct axis and the direction orthogonal to the direct axis coincide with the quadrature axis, and the closed loop is constructed so as to make the amplitude $|\Phi_2|$ of the secondary flux, i.e., the direct axis flux coincide with the command value $\Phi_{d2}^*$. The fundamental vector control can be carried out with such a feedback system. However, to improve the response during transient operation, the magnetization current calculator 11 and the slip frequency calculator 16 are employed The flux $|\Phi_2|$ for obtaining the magnetization current correction signal $\Delta i_{d1}^*$, and the torque current $i_{q1}$ for obtaining the slip frequency correction signal $\Delta\omega_s^*$, are calculated by a flux calculator 50 which will be described later.

After obtaining the primary current commands $i_{d1}^*$ and $i_{q1}^*$ and the slip frequency command $\omega_s^*$ through the formulas (2), (3) and (5), the succeeding vector control calculation is performed in the similar manner as described with the control apparatus shown in FIG. 1.

Next, the method of calculating or estimating the secondary flux $|\Phi_2|$ will be described.

Figure 5:
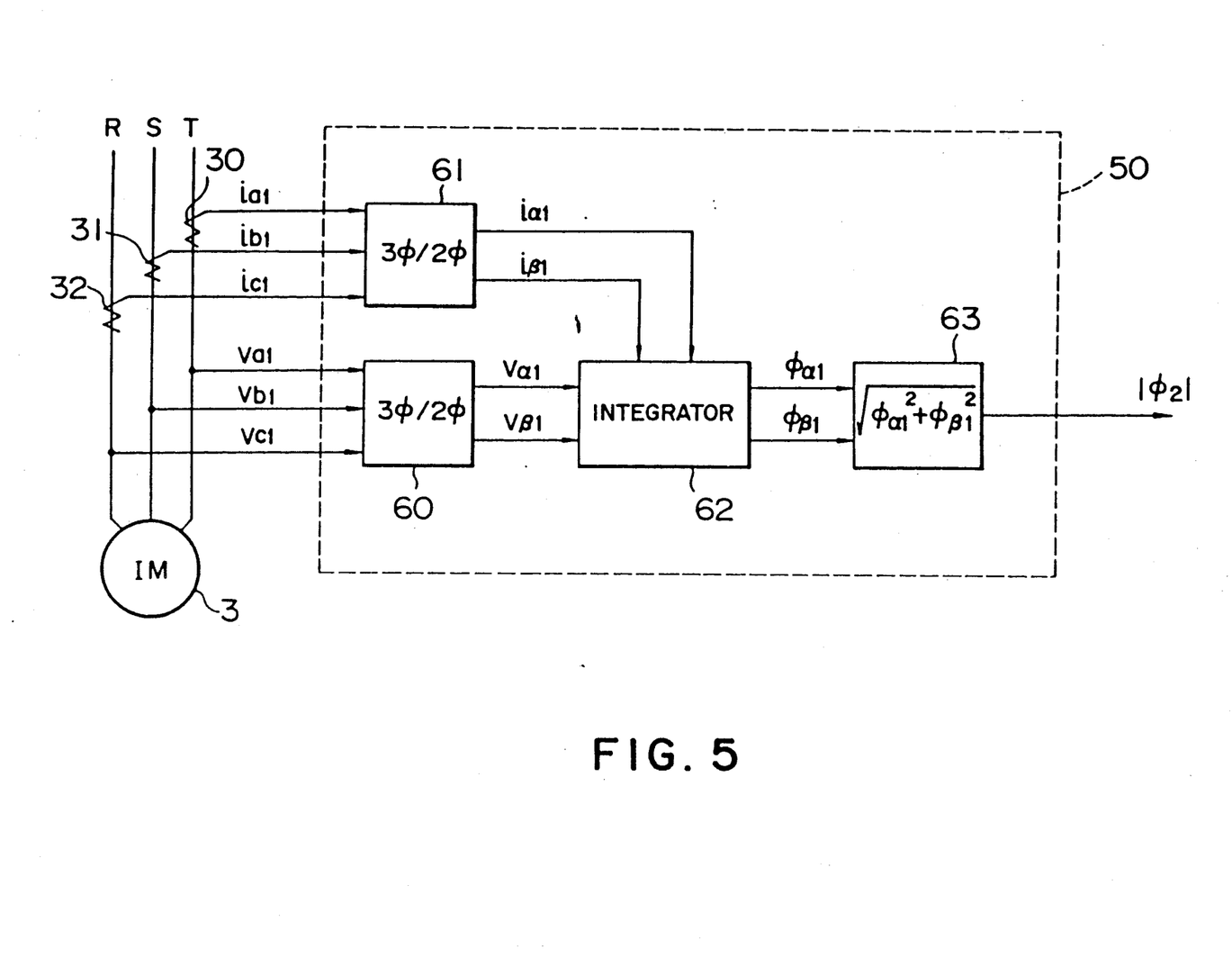
FIG. 5 is a block diagram showing an example of the circuit arrangement of the flux calculator shown in FIG. 4.

Similar to the case of the flux calculator 20 described with reference to FIG. 2, a flux calculator 50 shown in FIG. 5 can obtain the $\alpha$ axis component $\Phi_{\alpha 1}$ and $\beta$ axis component $\Phi_{\beta 1}$ of the secondary flux as expressed by the formulas (6) and (7) by using a 3Φ/2Φ converter 60, a 3Φ/2Φ converter 61 and an integrator 62, on the basis of the three phase voltages $v_{a1'}$, $v_{b1'}$ and $v_{c1}$ and three phase currents $i_{a1'}$, $i_{b1'}$ and $i_{c1}$ supplied to the induction motor 3.

The outputs of the integrator 62 are applied to a root square extractor 63 to obtain the secondary flux $|\Phi_2|$ which is the same both on the stationary two axes ($\alpha$ and $\beta$ axes) and on the rotary two axes (d and q axes). The secondary flux $|\Phi_2|$ obtained as the last output of FIG. 5 can be used for the secondary flux control system of the apparatus shown in FIG. 4. The secondary flux $|\Phi_2|$ can be estimated by using a state observer commonly used in the field of the current control theory, similar to the case described with FIG. 2. According to the estimation method, the direct axis flux $\Phi_{d2}$ and the quadrature axis flux $\Phi_{q2}$ as seen on the rotary coordinate (d and q axes) axes can be directly estimated, the secondary flux $|\Phi_2|$ being estimated as $\Phi_{d2} = |\Phi_2|$.

The direct axis component $\Phi_{d2}$ ($=x_1$) and the quadrature axis component $\Phi_{q2}$ ($=x_2$) of the secondary flux can be obtained by the state observer shown in FIG. 3. Therefore, in consideration of $|\Phi_2| = \Phi_{d2}$, these components are used, as described already, as the flux control feedback signals for the apparatus shown in FIG. 4.

It is possible to detect the torque current $i_{q1}$ by a known manner. In particular, the three phase currents $i_{a1'}$, $i_{b1'}$ and $i_{c1}$ are detected and subjected to a 3Φ/2Φ conversion to obtain the currents $i_{\alpha 1}$ and $i_{\beta 1}$ on the fixed two axes (d and q axes). Next, the currents $i_{d1}$ and $i_{q1}$ on the rotary two axes (d and q axes) are subjected to the following conversion:

$$\begin{pmatrix} i_{d1} \\ i_{q1} \end{pmatrix} = \begin{pmatrix} \cos\Phi & \sin\Phi \\ -\sin\Phi & \cos\Phi \end{pmatrix} \cdot \begin{pmatrix} i_{\alpha 1} \\ i_{\beta 1} \end{pmatrix} \quad (12)$$

where $\cos\Phi = \Phi_{\alpha 1}/|\Phi_2|$ and $\sin\Phi = \Phi_{\beta 1}/|\Phi_2|$.

The current $i_{q1}$ obtained through the calculation by the equation (11) is the torque current which is used as the feedback signal of the torque current control system of the apparatus shown in FIG. 4.

According to the above embodiment, the direct axis flux command to be determined by the motor constants and the slip frequency command to be determined by the torque command are feed-forwardly given, and the direct axis flux is fed back to correct the magnetization current based on the deviation of the direct axis flux from the flux command. The slip frequency is corrected on the basis of the deviation of the torque current from its command value by the feedback system which operates to make the torque current and its command value coincide with each other. Therefore, a highly precise vector control can be realized which automatically corrects a change of parameters, and the secondary resistance in particular.

What is claimed is:

1. A control apparatus for an induction machine comprising:
   means for detecting an actual secondary flux of said induction motor,
   means for detecting an actual torque current of said induction motor,
   magnetization current calculating means for calculating a magnetization current command on the basis of a secondary flux command,
   first correction means for correcting said magnetization current command as a function of said actual secondary flux so as to reduce to zero the deviation of said actual secondary flux from said secondary flux command relative to the direct axis in the flux direction of a rotary coordinate system;
   torque current calculating means for calculating a torque current command on the basis of a torque command,
   slip frequency calculating means for calculating a slip frequency command on the basis of the secondary flux command and the torque command, second correction means for correcting said slip frequency command as a function of said actual torque current so as to reduce to zero the deviation of said actual torque current from said torque current command, means for calculating a phase angle corresponding to said slip frequency command as corrected in said second correction means, means for generating a primary current command on the basis of said phase angle and an amplitude corresponding to a vector sum of the magnetization current command and the torque current command;

means for controlling the primary current of said induction machine on the basis of said primary current command.

2. A control apparatus for an induction apparatus according to claim 1, wherein said magnetization command is supplied feed-forwardly by calculating the direct axis magnetization current to be estimated from said secondary flux command and the induction machine constants, and said slip frequency command to be estimated from said secondary flux command, torque command and induction machine constants, to thereby perform vector control of said induction machine using both the direct axis flux control and slip frequency control.

* * * * *